Figure 1:
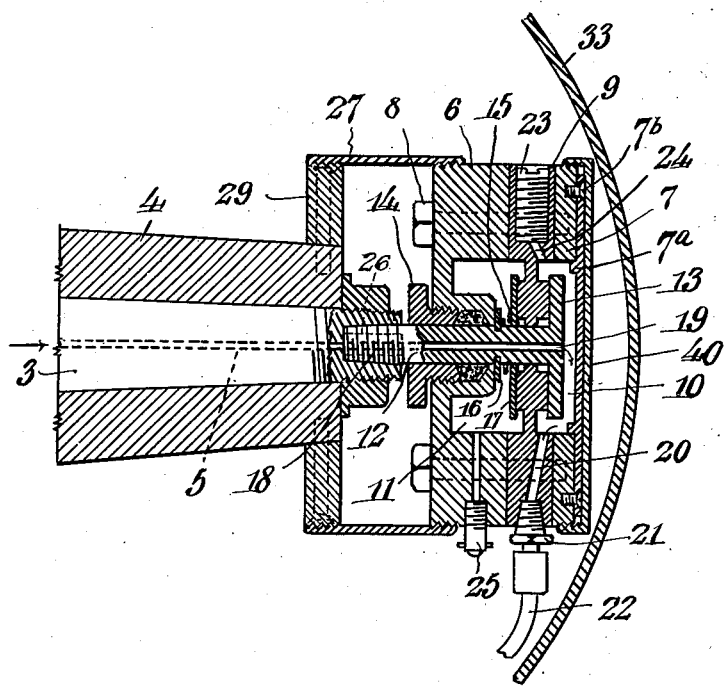

May 20, 1941. J. F. BOWERS 2,242,207
AIR DISTRIBUTING HEAD FOR TIRE INFLATION DEVICES
Filed March 1, 1939

Inventor
John F. Bowers,

By [signature]
Attorney

Patented May 20, 1941

2,242,207

UNITED STATES PATENT OFFICE 2,242,207

AIR DISTRIBUTING HEAD FOR TIRE INFLATION DEVICES

John F. Bowers, Georgetown, Del., assignor to Aidco Automatic Inflator and Deflator Company, Georgetown, Del., a corporation of Delaware Application March 1, 1939, Serial No. 259,293

5 Claims. (Cl. 152—415)

This invention relates to tire inflation devices, having particular reference to that type of inflation device disclosed by my former Patent No. 1,801,716, dated April 21, 1931.

In the aforesaid patent I have disclosed an air pump upon the chassis of a motor vehicle with means whereby the tires of the motor vehicle may be maintained under proper pressure, either while the vehicle is in motion or at rest. The said patent discloses the hub of each wheel equipped with a head or housing so constructed that air under pressure admitted thereto is delivered in the desired or required pressure to its respective tire.

The present invention is directed to improvements in the air distributing housing to be associated with the hub of each wheel, and it is understood that the housings may be supplied with air under pressure from an apparatus such as is disclosed in my aforesaid patent or from any other desired air pressure source.

The primary object of the present invention is to generally simplify and improve the air distributing housing in order that it may be manufactured or produced at low cost, involving but few simple and readily assembled parts, and of such construction as to enable the housing to be readily attached to either the front or rear axle of the vehicle.

A further object of the invention is to provide the air distributing housing with means whereby excessive pressures in the tires may be automatically prevented, and whereby deflation of the tires upon lowering of the pressure in the supply source may be prevented.

With these objects in view, together with others which will appear as the description proceeds, the invention consists in the novel construction, combination and arrangement of parts, all as will be described more fully hereinafter, illustrated in the drawing, and particularly pointed out in the claims.

Figure 2:
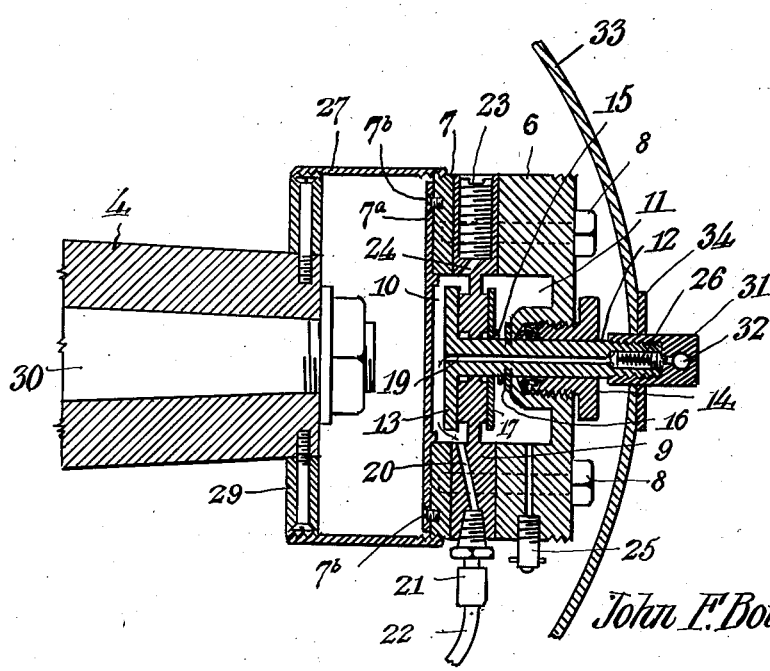

In the drawing:

Figure 1 is a longitudinal sectional view taken through the front wheel spindle of a conventional form of motor vehicle and illustrating as applied thereto an air distributing housing involving the present invention, Figure 2 is a similar view of the same housing applied to a conventional form of rear axle or spindle of a vehicle.

The present device, as in my former patent, contemplates the introduction of air under pressure to the front tires of the vehicle through the wheel spindles, while air under pressure is supplied to the tires of the rear wheels through a suitable conduit leading to a proper connection axially alined with the rear axle and projecting beyond the hub thereof. The distributing head of the present invention is so constructed as to be readily adaptable to either the front or rear spindles of the vehicle.

In Figure 1 of the drawing, the front spindle of the vehicle is indicated at 3, while 4 represents a conventional wheel hub properly mounted upon the spindle for rotation thereon. These parts being conventional, it will be understood that roller bearings may be employed if necessary or desired, and any preferred means for securing the wheel upon the spindle may be employed. The spindle 3 is provided with a longitudinal central bore 5 which is supplied with air under pressure from some suitable source (not shown) upon the vehicle with which the spindle is connected.

The air distributing housing consists essentially in a drum shaped or hollow cylindrical body including heads 6 and 7 secured together by bolts 8. The head 7 includes an annular plate 7a, removably secured to the head by screws 7b. Interposed between the members 6 and 7 is a wall 9 so arranged between the said heads as to divide the interior of the housing into an air distributing chamber 10 and a lubricant chamber 11. It will be understood that the heads and wall are tightly joined together in liquid and air tight manner.

Arranged axially within the housing is an air spindle 12, having an enlargement or head 13 at one end disposed within the air chamber 10, while its opposite end projects beyond the housing through a packing nut 14 upon the member 6 of the housing. An expansion spring 15 encircles the air spindle within the housing and bears against a shoulder 16 on the spindle. The opposite end of this spring engages a plate 17 abutting against the central part of the wall 9. This expansion spring exerts pressure upon the spindle in such manner as to maintain the enlargement or head 13 in flush engagement with the adjacent face of the wall 9. The mounting of the spindle within the housing is such that relative rotation between the housing and spindle is permitted, but the packing nut 14 maintains a union between the housing and the spindle so that leakage will be prevented.

The projecting end of the spindle is threaded as at 18 for engagement within a recessed and internally threaded end of the spindle 3, and the air spindle is equipped with a central bore or port 19 to aline with the corresponding bore 5 of the spindle 3.

The annular wall 9 is provided with a duct or passage 20 disposed radially thereof and in communication at its inner end with the air chamber 10. This port leads to a connection or take-off 21 by means of which air may be conducted to the tire (not shown) through a pipe or tube 22.

The wall 9 is also equipped with a relief valve represented generally at 23, and this valve may take any desired form or construction. The valve is in communication with the air chamber by means of a port or duct 24, and the construction of the relief valve is such as to discharge or vent the air chamber 10 to the atmosphere when excessive pressure within said chamber has been reached.

The lubricant chamber 11 may be supplied with grease or oil through the fitting 25, and it will be understood that this chamber will at all times be supplied with lubricant so as to reduce friction to a minimum and to eliminate wear due to relative movements between the housing and air spindle.

The protruding end of the air spindle 12 is equipped with the ordinary well known tire inflation valve represented generally at 26 and shown in Fig. 2 of the drawing; the said valve operating in such manner as to automatically close the passage to the escape of air to the chamber 10 outwardly through the spindle.

The housing and its associated mechanism is connected to the hub by means of a sleeve 27 threadedly engaged at one end with the exterior of the housing and similarly engaged at its opposite end with a shoulder or flange 29 secured to or projecting radially from the hub 4. For wheels not especially constructed for the attachment of housings of this kind, the flange members may be bolted to the hub as shown, but it will be understood that such flanges may be made integral with the hub if desired. When the housing is used upon the front spindle of the vehicle, a cap 40 is threadedly engaged over the end of head 7, to cover the plate 7a.

From the foregoing description it will be understood that air under pressure passing through the bore 5 of the spindle 3 will be admitted to the air chamber 10 through the bore 19 of the air spindle. This air will then pass through port 20 and connection 21 and tube 22 to the tire (not shown). Should the pressure exceed that degree for which the valve 23 is set to open, the latter will vent to atmosphere, thus eliminating possibility of injury to the tire due to overinflation. Should the pressure in the bore 5 drop below that in the air distributing chamber 10 the check valve 26 will immediately seat to prevent escape of air from the tire back to the pressure source.

In Figure 2 of the drawing, the same housing and its associated mechanism is disclosed as used in connection with the rear wheel of the motor vehicle and wherein the air is led from the pressure source through a pipe or tube exteriorly of the wheel spindle. In applying the housing to the rear axle, after the cap 40 is removed, the sleeve 27 will be engaged with the end of the housing opposite to that shown in Figure 1, so that the air spindle 12 will project axially and outwardly of the rear axle spindle 30. The projecting threaded end of the air spindle 12 will be equipped with a head 31 having an opening 32 therein to receive air under pressure through a suitable pipe or tube (not shown) from the source of air pressure. The operation of the mechanism as applied to the rear axle is identically the same as that before described excepting only that the air pressure is supplied through a tube or pipe beyond the wheel spindle.

The air distributing housing of the present invention is designed so as to be accommodated or housed within the now familiar (present day) type of enlarged wheel or hub caps indicated at 33. The entire mechanism is housed by the cap of the front wheel, while the cap of the rear wheel is provided with a central opening, as shown in Figure 2, to accommodate the protruding end of the air spindle 12. This spindle is maintained in proper position with relation to the hub cap by means of the plate 34.

From the foregoing it is apparent that the air distributing housing of the present invention will operate efficiently and satisfactorily to distribute the air from the source of pressure to the tire, whether it be for the front or rear wheel, and this proper pressure will be maintained at all times (whether or not the vehicle is moving), so long as the required pressure in the source is maintained. In instances where punctures occur, the injured tire will be kept to proper inflation notwithstanding the leakage, as air under sufficient pressure will be maintained to compensate for such losses.

Having thus described my invention, what I claim as new and useful is:

1. In a device of the class described, a housing adapted to be secured to a wheel hub, a wall in and separable from said housing and dividing the latter into chambers, an air spindle rotatably mounted in said housing, one end of said spindle communicating with one of said chambers, and an air take-off carried by said wall and in communication with said air chamber.

2. In a device of the class described, a housing closed at both ends and adapted to be secured to a wheel hub, a wall in said housing dividing the latter into air and lubricant chambers, an air spindle axially alined with said hub and rotatably mounted in said housing, one end of said spindle communicating with said air chamber, and an air take-off carried by said wall and in communication with said air chamber.

3. In a device of the class described, a housing closed at both ends and adapted to be secured to the end of a wheel hub, a wall in said housing dividing the latter into air and lubricant chambers, an air spindle axially alined with said hub and rotatably mounted in said housing, one end of said spindle communicating with said air chamber, an air take-off carried by said wall and in communication with said air chamber, and a pressure relief valve in said wall and also in communication with said air chamber.

4. In a device of the class described, an annular housing closed at both ends, means for securing said housing in axial alinement with a wheel hub, a wall in said housing dividing the latter into air and lubricant chambers, an air spindle rotatably mounted in said housing and disposed axially thereof, one end of said spindle communicating with said air chamber, an air take-off in said wall in communication with said air chamber, and the opposite end of said spindle adapted to receive air under pressure.

5. In a device of the class described, a substantially hollow cylindrical housing closed at both ends, means whereby either end of said housing may be secured to the end of a wheel hub and supported in axial alinement therewith, a wall in said housing dividing the latter into air and lubricant compartments, an air spindle rotatably mounted in said wall axially of said housing, one end of said spindle communicating with said air chamber, the opposite end of said spindle projecting through an end wall of said housing, an air take-off connection in said wall, and said connection in communication with said air chamber.

JOHN F. BOWERS.